US012012940B2

(12) United States Patent
Martin Heinzmann et al.

(10) Patent No.: US 12,012,940 B2
(45) Date of Patent: Jun. 18, 2024

(54) METHOD OF RETROFITTING A WIND TURBINE

(71) Applicant: Vestas Wind Systems A/S, Aarhus (DK)

(72) Inventors: Alejandro Albert Martin Heinzmann, Karlsruhe (DE); Brian Jørgensen, Galten (DK)

(73) Assignee: Vestas Wind Systems A/S, Aarhus (DK)

(*) Notice: Subject to any disclaimer, the term of this patent is extended or adjusted under 35 U.S.C. 154(b) by 0 days.

(21) Appl. No.: 17/777,345

(22) PCT Filed: Nov. 13, 2020

(86) PCT No.: PCT/DK2020/050309
§ 371 (c)(1),
(2) Date: May 17, 2022

(87) PCT Pub. No.: WO2021/098923
PCT Pub. Date: May 27, 2021

(65) Prior Publication Data
US 2022/0412321 A1 Dec. 29, 2022

(30) Foreign Application Priority Data
Nov. 21, 2019 (DK) .................................. 201970710

(51) Int. Cl.
*F03D 80/50* (2016.01)
*F03D 7/02* (2006.01)
*F03D 13/20* (2016.01)

(52) U.S. Cl.
CPC ........... *F03D 80/50* (2016.05); *F03D 7/0204* (2013.01); *F03D 13/20* (2016.05);
(Continued)

(58) Field of Classification Search
CPC ........ F03D 7/0204; F03D 13/10; F03D 13/20; F03D 80/50; F05B 2230/80;
(Continued)

(56) References Cited

U.S. PATENT DOCUMENTS 4,323,331 A * 4/1982 Schachle ................. F03D 13/20
416/9
7,891,939 B1 2/2011 Zuteck
(Continued)

FOREIGN PATENT DOCUMENTS

CA 2989460 A1 * 6/2018 ........... E04H 12/085
CN 108678908 A 10/2018
(Continued)

OTHER PUBLICATIONS

Danish Patent and Trademark Office, Search and Examination Report in PA 2019 70710, Apr. 30, 2020.
(Continued)

*Primary Examiner* — John M Zaleskas
(74) *Attorney, Agent, or Firm* — Wood Herron & Evans LLP

(57) ABSTRACT

A method of retrofitting a wind turbine (10) having a wind turbine tower (12) and a first energy generating unit (14) includes rotating at least a portion of the wind turbine tower (12). The wind turbine tower (12) is secured to a foundation (16) and has a first position on the foundation (16). The method includes rotating at least a portion of the wind turbine tower (12) from the first position to a second position. In the second position, the portion experiences less stress when the wind turbine (10) is operated in the same prevailing wind. The wind turbine tower (12) may have at least two sections (12a, 12b, 12c) and wherein rotating includes rotating one section relative to another section. One section may be secured to a foundation (16). In that case,
(Continued)

rotating may or may not include rotating the section secured to the foundation (16). Rotating the tower may occur after the first energy generating unit (14) is removed from the tower and may include rotating the wind turbine tower by an angle from 90°±15° relative to the first position.

19 Claims, 6 Drawing Sheets

(52) U.S. Cl.
CPC ..... *F05B 2230/80* (2013.01); *F05B 2240/912* (2013.01); *F05B 2250/411* (2013.01)

(58) Field of Classification Search
CPC .. F05B 2240/912; Y02E 10/72; Y02E 10/728; Y02P 70/50
See application file for complete search history.

(56) References Cited

U.S. PATENT DOCUMENTS

| | | | |
|---|---|---|---|
| 9,982,659 B1* | 5/2018 | Leonard | F03D 13/20 |
| 10,352,297 B2 | 7/2019 | Richert et al. | |
| 2006/0213145 A1* | 9/2006 | Haller | F03D 13/20 |
| | | | 52/651.01 |
| 2009/0123283 A1* | 5/2009 | Corren | F03B 13/264 |
| | | | 416/9 |
| 2010/0281818 A1* | 11/2010 | Southworth | E02D 35/00 |
| | | | 52/745.17 |
| 2011/0006536 A1 | 1/2011 | Liu | |
| 2011/0058944 A1* | 3/2011 | Zuteck | F03D 13/20 |
| | | | 29/889 |
| 2011/0058956 A1* | 3/2011 | Zuteck | F03D 80/70 |
| | | | 416/244 R |
| 2011/0123331 A1* | 5/2011 | Stiesdal | F03D 7/043 |
| | | | 416/1 |
| 2012/0217748 A1* | 8/2012 | Gjerlov | F03D 7/0268 |
| | | | 290/44 |
| 2012/0304588 A1* | 12/2012 | von Ahn | E04H 12/18 |
| | | | 52/745.17 |
| 2013/0156596 A1* | 6/2013 | Himmelmann | F03D 13/20 |
| | | | 416/244 R |
| 2013/0243531 A1* | 9/2013 | Fernandez Gomez | F03D 13/22 |
| | | | 405/207 |
| 2013/0299277 A1 | 11/2013 | Kyatham et al. | |
| 2014/0039807 A1* | 2/2014 | Van | G07C 3/00 |
| | | | 702/34 |
| 2014/0102039 A1* | 4/2014 | Wagner | F03D 80/50 |
| | | | 52/745.18 |
| 2014/0241882 A1* | 8/2014 | Caruso | F03D 7/0212 |
| | | | 416/17 |
| 2015/0027068 A1* | 1/2015 | Sayers | E02D 27/32 |
| | | | 52/745.18 |
| 2015/0167646 A1* | 6/2015 | Hammerum | F03D 7/0224 |
| | | | 416/1 |
| 2018/0038350 A1* | 2/2018 | Leonard | F03D 13/20 |
| 2018/0119381 A1* | 5/2018 | Garcia | E02D 27/50 |
| 2018/0171979 A1* | 6/2018 | Spruce | F03D 7/0292 |
| 2020/0378367 A1* | 12/2020 | Bachmann | F03D 7/042 |
| 2021/0199095 A1* | 7/2021 | Bachmann | F03D 7/042 |
| 2021/0363972 A1* | 11/2021 | Baun | F03D 13/10 |
| 2022/0235743 A1* | 7/2022 | Baun | F03D 80/50 |
| 2022/0381225 A1* | 12/2022 | Mane | F03D 13/10 |
| 2023/0050065 A1* | 2/2023 | Bachmann | F03D 7/0292 |

FOREIGN PATENT DOCUMENTS

| | | | | |
|---|---|---|---|---|
| CN | 108894920 A | 11/2018 | | |
| CN | 208456780 U | 2/2019 | | |
| CN | 209510524 U | 10/2019 | | |
| KR | 20130085122 A | 7/2013 | | |
| KR | 20180071131 A | * | 6/2018 | ........... E04H 12/085 |
| WO | 2009064192 A1 | 5/2009 | | |
| WO | 2011099915 A1 | 8/2011 | | |
| WO | 2012107051 A1 | 8/2012 | | |
| WO | 2018184642 A1 | 10/2018 | | |
| WO | WO-2018184642 A1 | * | 10/2018 | ........... F03D 7/0292 |

OTHER PUBLICATIONS

European Patent Office, International Search Report and Written Opinion in PCT Application No. PCT/DK2020/050309, Jan. 26, 2021.

* cited by examiner

METHOD OF RETROFITTING A WIND TURBINE

TECHNICAL FIELD

The invention relates generally to wind turbines, and more particularly to a method of retrofitting a wind turbine having a tower and an energy generating unit to extend the life expectancy of the tower.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower and an energy generating unit positioned atop of the tower. The energy generating unit typically includes a nacelle to house mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator.

During a lifetime of a wind turbine, which can span multiple decades, one or more components may approach an end to their usefulness prior to other components. The wind turbine industry is searching for solutions to extend the usefulness of those components at minimal cost and thereby improve a business case for wind power production.

SUMMARY

To these and other ends, a method of retrofitting a wind turbine is provided. The wind turbine has a wind turbine tower secured to a foundation. The wind turbine tower supports a first energy generating unit. The wind turbine tower has a first position on the foundation. The first position is the original installation position. The method includes rotating at least a portion of the wind turbine tower relative to the first position.

In one embodiment, the wind turbine tower has at least two sections and rotating includes rotating one section relative to another section. By way of example, one section is secured to the foundation and rotating does not include rotating the section secured to the foundation. However, in one embodiment, rotating may include rotating each section relative to the first position. Rotating the wind turbine tower may include rotating by an angle from 90°±15° relative to the first position.

In one embodiment, rotating the wind turbine tower may be completed in conjunction with repowering or retrofitting the wind turbine and wherein prior to rotating, the first energy generating unit is removed from the tower. Further in that regard, in one embodiment, after rotating, a second energy generating unit is installed on the wind turbine tower.

In one embodiment, prior to rotating, the method includes determining a direction of a prevailing wind when the wind turbine tower is at the first position. Rotating then includes rotating at least the portion of the wind turbine tower to a different position relative to the direction of the prevailing wind.

An additional or an alternative embodiment includes determining a portion of the wind turbine tower experiencing a relatively high stress at the first position. Rotating at least the portion of the wind turbine tower includes rotating the portion of the wind turbine tower to a second position different from the first position. At the second position, the portion that experienced the relative high stress is subject to a lower stress during continued operation of the wind turbine.

In one embodiment, prior to rotating, the method includes measuring damage on the at least a portion of the wind turbine tower. In that regard, the method may further include measuring damage on a leading wall portion of the wind turbine tower. In addition, the method may include measuring damage on a sidewall portion that is generally orthogonally oriented relative to a leading wall portion of the wind turbine tower.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
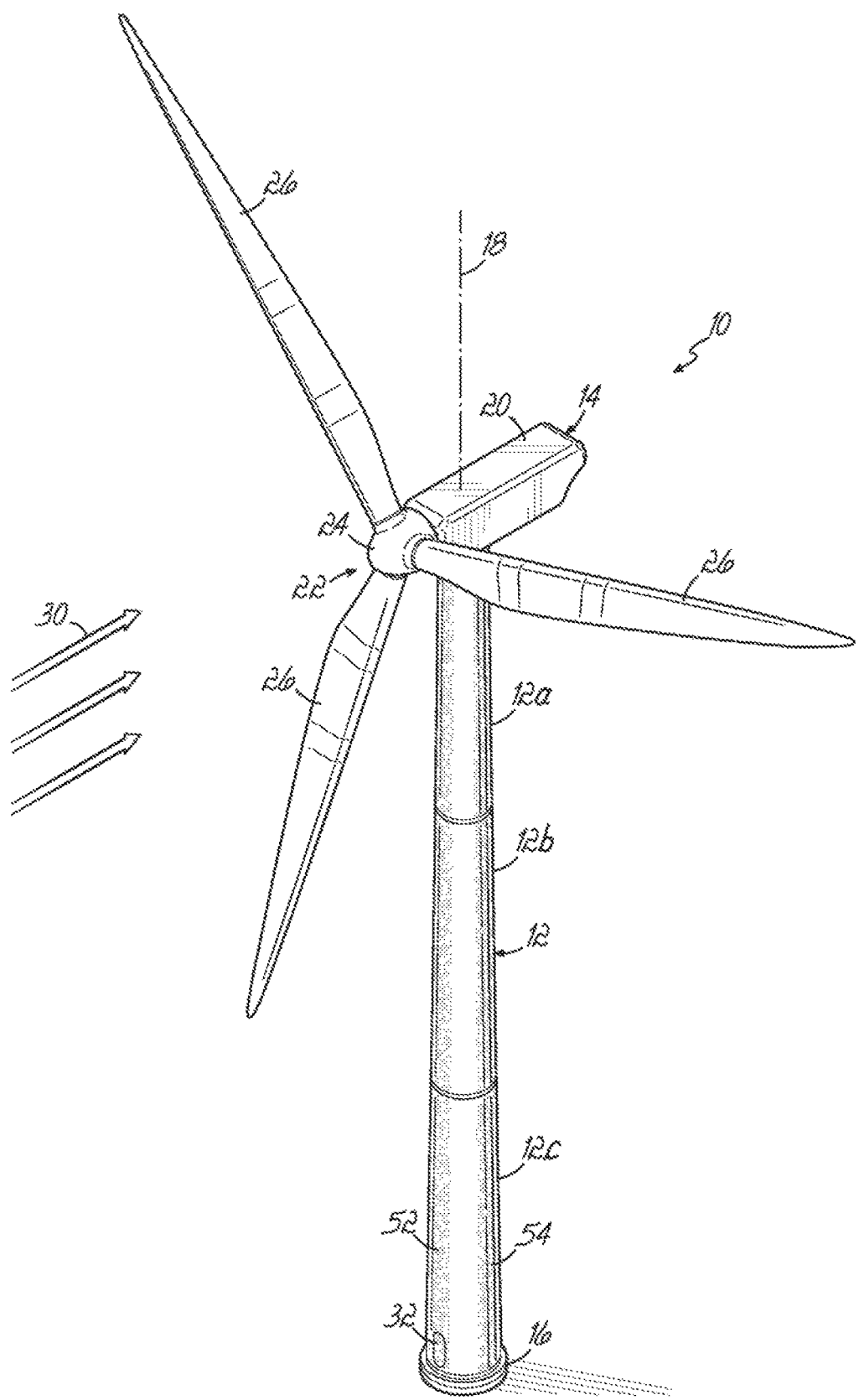
FIG. 1 is a perspective view of a wind turbine having a tower and a first energy generating unit.

With reference to FIG. 1, a wind turbine 10 includes a tower 12 and an energy generating unit 14 disposed at the apex of the tower 12. The tower 12 may be coupled to a foundation 16 at a lower end thereof. The exemplary tower 12 shown is modular and includes three sections 12a, 12b, and 12c that collectively define a generally vertical tower axis 18 about which the energy generating unit 14 may rotate via a yaw mechanism (not shown). The foundation 16 may be a relatively large mass (e.g., concrete, anchor cage, etc.) embedded in the ground and through which forces on the wind turbine 10 may be ultimately transferred. Although not shown, in an alternative embodiment, the foundation 16 may include an offshore platform or the like used in offshore wind turbine applications. The energy generating unit 14 includes the part of the wind turbine 10 which transforms the energy of the wind into electrical energy. In this regard, the energy generating unit 14 typically includes a housing or nacelle 20, a rotor 22 having a central hub 24 and one or more blades 26 (e.g., three blades) mounted to the central hub 24 and extending radially therefrom, and a generator (not shown) for converting mechanical energy into electrical energy. The energy generating unit 14 may further include a drive train (not shown), including a gear arrangement, interconnecting the rotor 22 and the generator. The generator and a substantial portion of the drive train may be positioned inside of the nacelle 20 of the wind turbine 10. In addition to the generator, the nacelle 20 typically houses miscellaneous components required for converting wind energy into electrical energy and various components needed to operate, control, and optimize the performance of the wind turbine 10. The wind turbine blades 26 are configured to interact with the wind. In that regard as is shown in FIG. 1, there is typically a prevailing wind 30 (shown as arrows and described below) that produces lift and causes the rotor 22 to spin or rotate generally within a plane defined by the wind turbine blades 26. In any respect, the energy generating unit 14 is able to generate power from the airflow that passes through the swept area of the rotor 22. The tower 12 supports the load of the energy generating unit 14 and operates to elevate the energy generating unit 14, and especially the rotor 22, to a height above ground level or sea level at which faster moving air currents of lower turbulence are typically found. The tower 12 may include a door 32 at ground level through which personnel may enter and leave the tower 12. Although not shown, the tower 12 includes internal ladders that permit personnel to internally access equipment (e.g., the generator and drivetrain), positioned inside the nacelle 20. As is described below, embodiments of the invention include moving (i.e., rotating) the tower 12 from its originally installed orientation or position to a new orientation relative to the prevailing wind 30. This effectively extends the service life of the tower 12 at a particular wind turbine installation site.

Figure 2A:
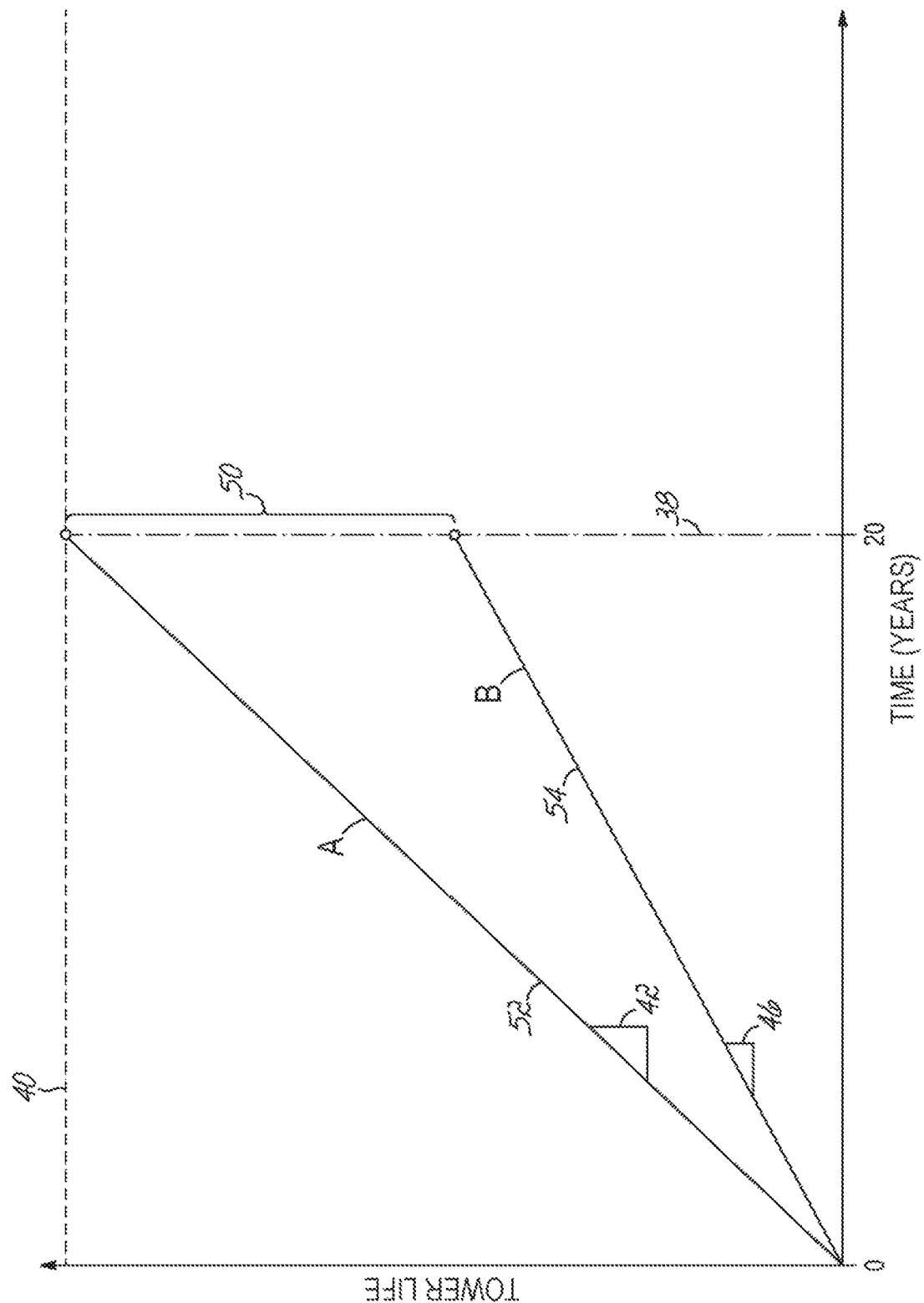
FIGS. 2A and 2B are schematic diagrams of tower life versus time that conceptually demonstrate aspects of the present invention.

FIG. 2A is a schematic illustration of aspects of the present invention and shows a relationship between the tower life versus time (e.g., in years). Generally, with reference to FIG. 1, each component of the wind turbine 10 has a service life that is measured against a predetermined life expectancy based on design of that component. In accordance with the present invention, for example, the wind turbine tower 12 has a life expectancy design value 38 (measured along the x-axis in FIG. 2A). The life expectancy design value 38 represents the amount of time that the wind turbine tower 12 is designed to be in service. The wind turbine tower 12 has a total tower life 40 (measured along the y-axis in FIG. 2A). The wind turbine tower 12 is designed to accommodate a predetermined amount of damage before the structural integrity of the tower 12 falls below an acceptable level (e.g., accounting for safety factors, etc.). The total tower life 40 may be a function of the physical (e.g., diameter and thickness) and material properties of the tower 12. Conceptually, the total tower life 40 may be thought of as a measure of the cumulative damage that the tower 12 is capable of safely sustaining. The total tower life 40 schematically illustrates the maximum cumulative damage permitted following installation. Ideally, the wind turbine tower 12 is capable of absorbing damage sufficient to achieve the life expectancy design value 38 for the tower 12.

By way of example and with reference to FIGS. 1 and 2A, during operation of the wind turbine 10, the tower 12 absorbs damage from the stresses imposed upon it. That damage absorption is represented by a first tower life rate 42 (FIG. 2A). As shown in FIG. 2A, the first tower life rate 42 is a slope of Curve A and may be conceptually thought of as a rate that the tower 12 absorbs damage during operation of the wind turbine 10 with the first energy generating unit 14. Ideally, Curve A intersects the total tower life 40 at the life expectancy design value 38, which may be about twenty years. In that case then, the tower 12 is successfully utilized for its designed life and the financial investment in at least the tower 12 is returned. Of course, if the first tower life rate 42 for a specific tower is higher than expected (i.e., the slope of Curve A in FIG. 2A is steep and the rate of damage absorption is high) then the tower 12 would not likely reach the life expectancy design value 38. Conversely, if the first tower life rate 42 is lower than expected (i.e., the slope of Curve A in FIG. 2A is shallow and the rate of damage absorption is low) then the tower 12 would likely reach or may even be kept in service past the life expectancy design value 38. For purposes of illustration, the first tower life rate 42 is shown as being substantially constant during operation of the wind turbine 10 such that Curve A is represented by a straight line. In reality, the first tower life rate 42 may not necessarily be constant such that Curve A may be generally curvilinear. Alternatively, the first tower life rate 42 may represent an average or effective value such that the curve is essentially a straight line.

As one would expect, the tower life rate 42 generally depends on the environment surrounding the tower 12. The environment produces various loads on the tower 12 that place the tower 12 under stress. The stress may be from weather (e.g., the wind or other environmental stress) and/or mechanical loads from equipment on the wind turbine tower 12. Generally, the higher the stresses on the tower 12, the higher the tower life rate 42. Similarly, the lower the stresses on the tower 12, the lower the tower life rate 42. The wind turbine tower 12 is generally designed with the life expectancy design value 38 of about twenty years. Thus, with an estimate of the loads that will be imposed on the tower 12, and the stress caused by those loads during operation at a particular installation site, the first tower life rate 42 may be estimated and the tower 12 may be designed (e.g., diameter, thickness, etc.) so as to have the total tower life 40 at the desired life expectancy design value 38.

According to embodiments of the invention, the inventors identified that the wind turbine tower 12 sustains damage that is unique to the environment in which it operates. That damage is not uniformly distributed across all of the portions of the wind turbine tower 12. That is, there are portions of the wind turbine tower 12 that are subject to relatively higher stresses than other portions of the tower 12 and thus the portions under higher stress sustain damage at a relatively higher rate. With reference to FIG. 2A, the tower life rate 42 may represent the highest damage rate observed for one portion of the wind turbine tower 12. For that reason, that portion is utilized in calculating the total tower life 40 at the life expectancy design value 38. All other regions of the wind turbine tower 12 may be subject to a lower tower life rate. Because they are subject to relatively lesser stresses, the rate of damage on those regions is lower. This is represented conceptually by the Curve B in FIG. 2A.

In that regard, Curve B is defined by a second tower life rate 46 that is less than the tower life rate 42 of Curve A. Curve B represents the tower life rate 46 for portions of the wind turbine tower 12 other than the portion absorbing the highest damage rate that is represented by Curve A. As shown in FIG. 2A, the portions of the wind turbine tower 12 that experience lower stress may reach the life expectancy design value 38 of 20 years with useful life remaining. This excess usefulness is represented by a remaining service life 50 in FIG. 2A. Meanwhile in the same timeframe of the life expectancy design value 38, the portion of the wind turbine tower 12 that is represented by Curve A will reach its total tower life 40. Embodiments of the invention capture the remaining service life 50 present in the lower stress portions of the tower 12. In this way, embodiments of the invention extend the useful life of the wind turbine tower 12.

To that end, the portions of the wind turbine tower 12 that initially experience high stress (i.e., that are represented by Curve A) are relocated to positions in which they experience less stress. And, the portions of the wind turbine tower 12 that initially experience relatively low stress (i.e., that are represented by Curve B) are relocated to positions in which they experience high stress. In this way, by repositioning those portions of the tower 12 having the remaining service life 50 before any portion of the tower 12 reaches the respective total tower life 40, operators may extend the useful life of the tower 12.

Figure 4:
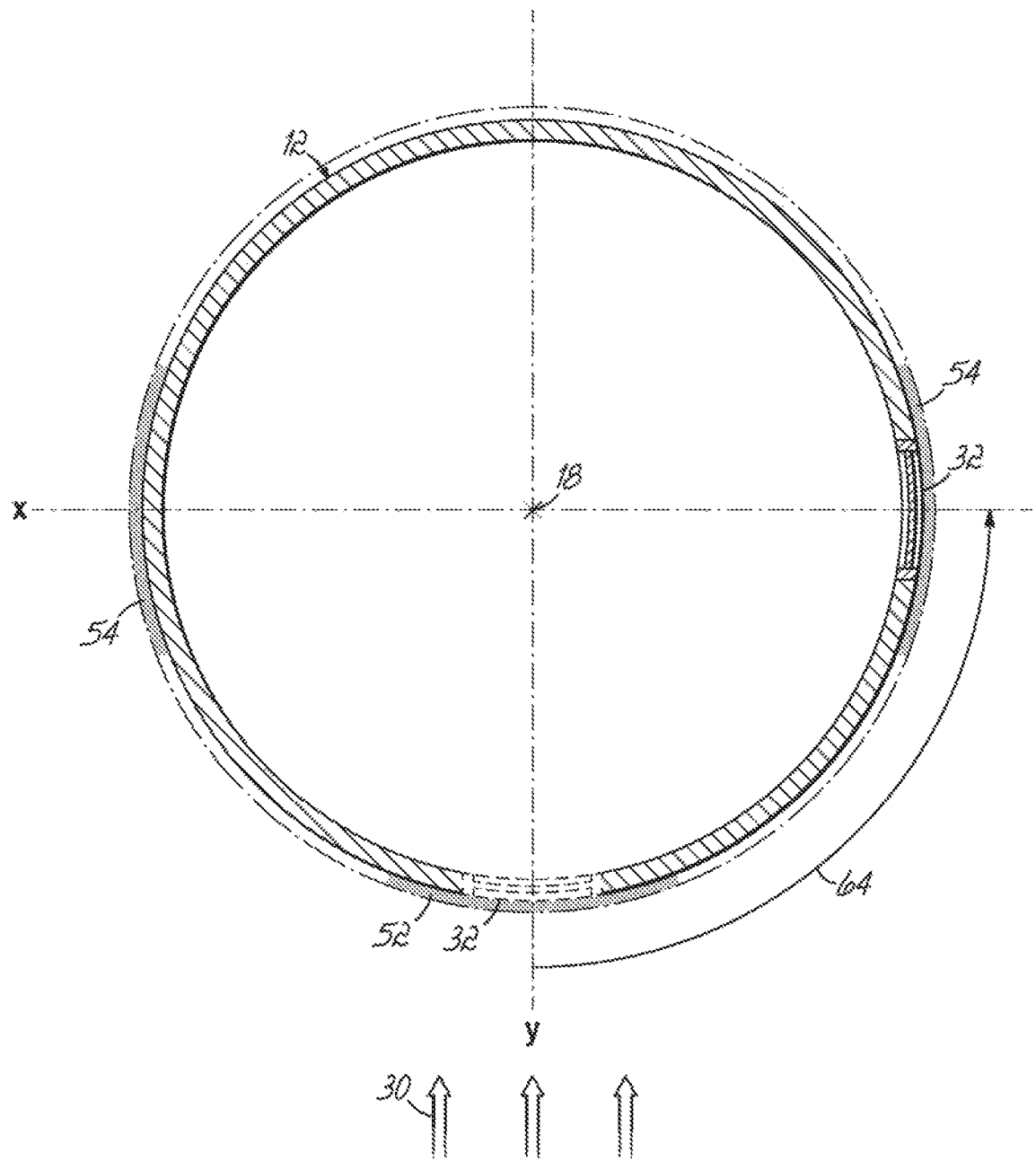
FIG. 4 is a cross-sectional view of the tower of FIG. 3 taken along section 4-4.

As an example, referring to FIGS. 1 and 4, the installation site of the wind turbine 10 may be characterized by the prevailing wind 30. The prevailing wind 30 may be due to the topography of the surrounding land and/or the general geographical location on the Earth's surface. Frequency, magnitude, and direction of the wind may be measured at the installation site. That information may be used to construct a wind rose from which the prevailing wind 30 is determined. In any respect, the environment subjects the wind turbine 10 to prolonged environmental loading predominately from one direction, that is, from the direction of the prevailing wind 30. This environment creates non-uniform stress on the wind turbine tower 12. At least the wall of the wind turbine tower 12 that faces into the prevailing wind 30 is subject to the highest stress, both in terms of mechanical stress and weathering. The mechanical stress is due in part to bending forces produced on the wall of the wind turbine tower 12 as the rotor 22 captures energy from the wind. That rotor thrust causes the wind turbine tower 12 to bend in the direction of the prevailing wind 30. The wall portion of the wind turbine tower 12 that experiences the highest stresses from bending is generally indicated at 52 and includes the leading wall of the wind turbine tower 12 as it faces into the prevailing wind 30. The leading wall portion 52 may extend the height of the tower 12. Although not shown, there may be significant variation of the stress within the leading wall portion 52 along the height of the tower 12. The stress in the wall portion is accounted for in the tower life rate 42 (FIG. 2A). In that regard and with reference to FIG. 2A, the tower life rate 42 of Curve A is primarily determined by the leading wall portion 52, because it is subject to the largest prolonged stress. Although not shown, the trailing wall portion of the wind tower 12 may be subject to a stress of similar magnitude but oppositely directed, i.e. when the leading wall portion is in tension due to bending the trailing wall portion will be in compression with stresses of similar magnitude. So, when loading, damage and stress is discussed in the context of the present application and the leading wall portion 52 is mentioned, it shall be understood that the trailing wall portion is experiencing similar loading and stresses.

Other wall portions of the wind turbine tower 12 do not experience that same prolonged stress. For example, as is shown in FIGS. 1 and 4, the sidewall portion 54 is oriented generally orthogonally to the leading wall portion 52. Applicants have identified that this sidewall portion 54 is subject to a lower level of stress than the leading wall portion 52. Consequently, the sidewall portion 54 absorbs damage at a lower rate than the leading wall portion 52. The stress in the sidewall portion 54 is accounted for in the tower life rate 46 (FIG. 2A). Although not labeled, the wall portion opposing the sidewall portion 54 may be subject to a similar stress as the sidewall portion 54. In FIG. 4, the wall portions intersected by the x-axis may be similarly stressed when the prevailing wind 30 is parallel to the y-axis. While embodiments of the invention are directed to the wind turbine tower 12, it is appreciated that the foundation 16 bears a significant stress and that stress, while high (it is likely higher than the stress observed on the tower), is not believed to be a limiting factor in most installations because of the large safety margins that are built into its design. Although not shown in the figures, extreme load design drivers for the foundation 16 are grout at the interface with the tower 12, concrete in a pedestal underneath the grout, and concrete/radial reinforcement in a foundation bottom mat. Because the tower 12 is believed to be one limiting factor, the tower rotation relative to the prevailing wind 30 (and relative to the foundation 16) may extend the service life of the wind turbine 10 without reaching the fatigue life of the foundation 16.

Referring to FIGS. 1, 2A, and 4, by way of example only, a damage rate to the sidewall portion 54 may be from about 20% to about 50% of a damage rate to leading wall portion 52, and by way of additional example the damage rate to sidewall portion 54 may be from about 30% to about 50% of the damage rate to leading wall portion 52. The relative tower life rates 42 and 46 in FIG. 2A may be directly related to the relative damage rates of the wall portions 52 and 54, respectively. It will be appreciated that the wall portions 52 and 54 are indicated in the figures as general regions in the wall on a circular cross-section tower 12. The region of highest loading from rotor thrust may vary generally along the perimeter of the wind turbine tower 12 near the y-axis, because the prevailing wind 30 may shift according to the weather patterns, such as shifting with a particular season, at the installation site. Further, while the prevailing wind 30 is shown in one particular direction so that it is perpendicular to a tangent at the y-axis, embodiments of the invention are not limited to the direction shown as the prevailing wind 30 will likely shift with seasons so that it is tangent to other wall portions near the y-axis. Because the prevailing wind 30 may vary, the wall portions 52 and 54 are only generally indicated in the figures.

Figure 5:
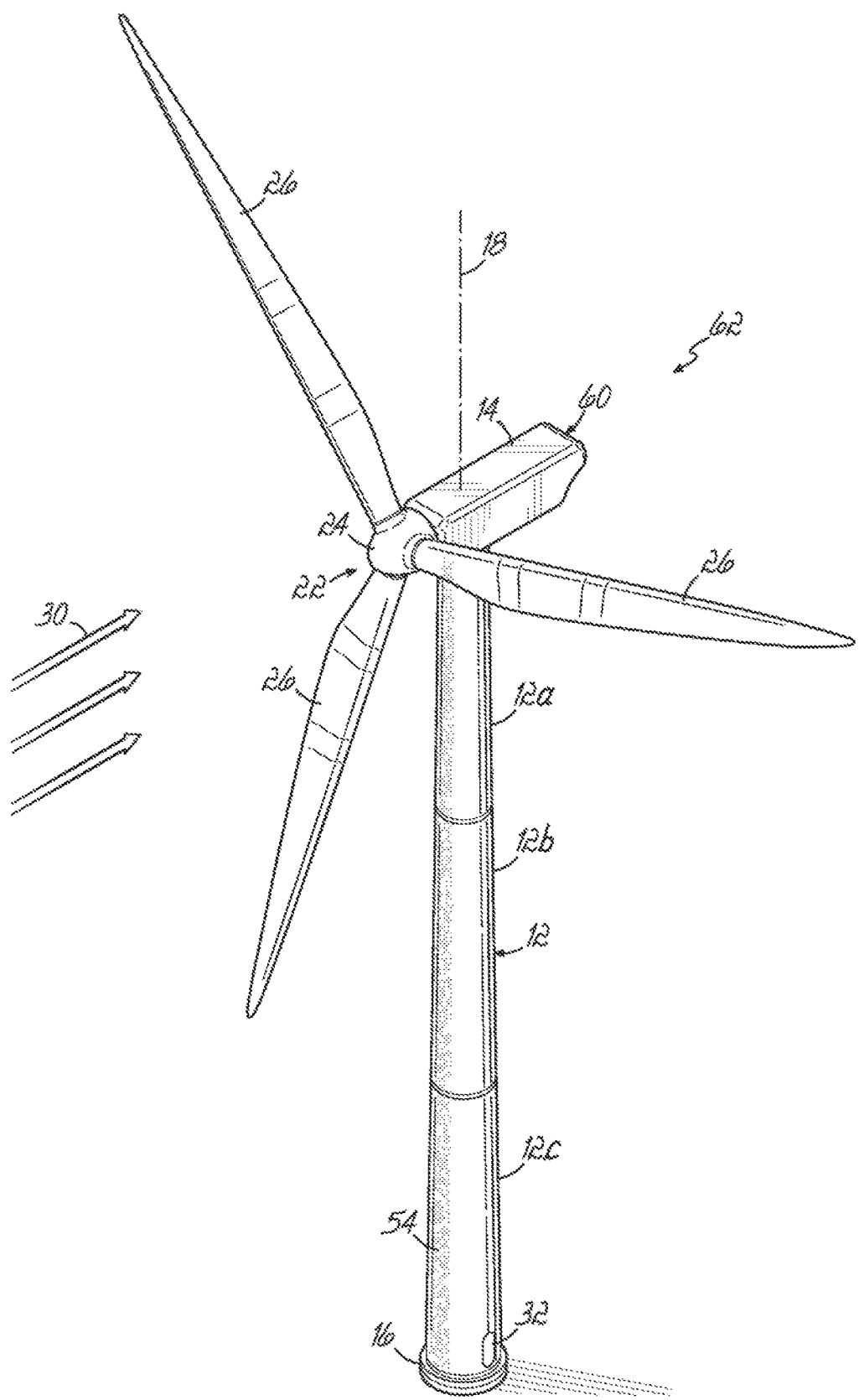
FIG. 5 is a perspective view of a wind turbine having the tower of FIG. 1 following retrofit with a second energy generating unit.

After the wind turbine 10 is operated for a few years and when a prevailing wind 30 is present, the wind turbine tower 12 may be reoriented, essentially to move the wall portions 52 and 54 relative to the prevailing wind 30. As an example, with reference to FIG. 3, in one embodiment, the wind turbine tower 12 may be rotated during a retrofit to replace one energy generating unit 14 with a new energy generating unit 60 (FIG. 5). At that time, a crane will be present so that the cost of rotating the wind turbine tower 12 may be relatively insignificant. While tower rotation is described in conjunction with a retrofit of the energy generating unit, embodiments of the invention are not limited to that combination. The tower 12 may be rotated at any time and achieve the advantages described herein.

Figure 3:
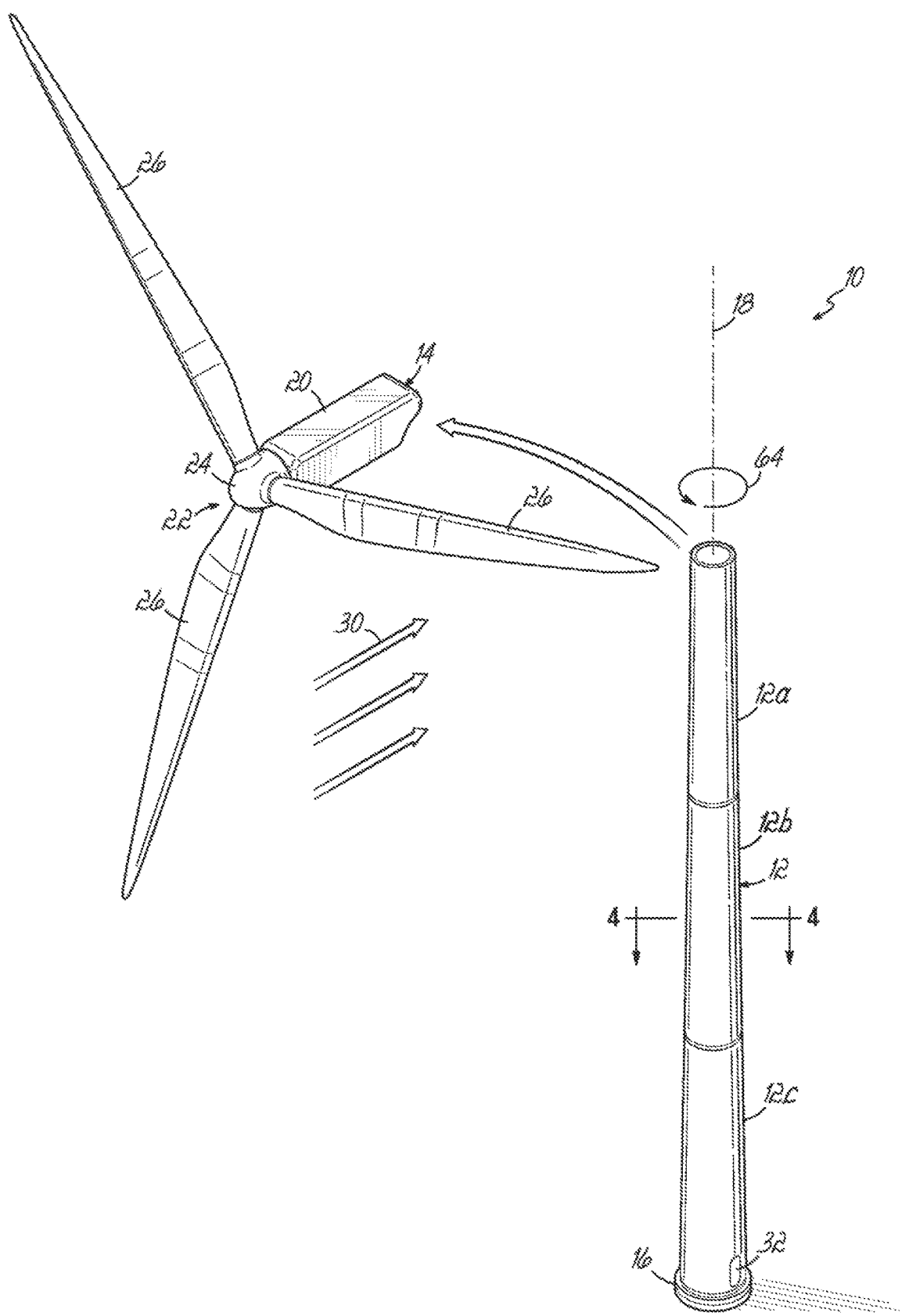
FIG. 3 is a perspective view of the wind turbine of FIG. 1 during a retrofit of the first energy generating unit.

Once the energy generating unit 14 is removed, as is shown in FIG. 3, one or more sections 12a, 12b, and 12c is rotated (indicated by arrow 64) relative to the prevailing wind 30. While a counter clockwise rotation is shown, a clockwise rotation may achieve the advantages described herein. Although not shown in the figures, a tower flange of the tower section 12c (i.e., the bottom tower section) may be embedded in grout (not shown). Therefore, if the tower section 12c is to be rotated with or without rotating each of the sections 12a and 12b, the grout that fixes the tower section 12c in position should be removed. Grouting is then re-done after the tower section 12c is rotated. It will be appreciated that removal of the grout should be carefully completed to avoid or minimize damage to the tower section 12c. The tower section 12c does not necessarily have to be rotated as the tower sections 12a and 12b may be rotated relative to the tower section 12c and at least a portion of the advantages of the invention may be realized.

Rotation of the wind turbine tower 12 (i.e., one or more sections 12a, 12b, and 12c) is illustrated with reference to movement of the door 32. As is shown in FIG. 1, the door 32 faces the prevailing wind 30. In the example, the door 32 locates the leading wall portion 52. Rotation of the wind turbine tower 12 is illustrated by movement of the door 32 from FIG. 1 to FIG. 3 relative to the prevailing wind 30. This is also shown in FIG. 4 with rotation of the wind turbine tower 12 indicated by arrow 64. The door 32 is shown in phantom line at initial, installed position of the tower 12. While FIG. 4 depicts an exemplary 90° rotation of the wind turbine tower 12, as it relates to movement of the door 32, rotation of one or more sections 12a, 12b, and 12c of the wind turbine tower 12 is not limited to 90°. Rotations of more or less than 90° for each is contemplated.

In one embodiment, each of the sections 12a, 12b, and 12c is rotated in a single rotation with all sections 12a, 12b, and 12c coupled together. Advantageously, no disassembly is required. By way of example, the rotation angle 64 may be from 90°±15°. Further, the degree to which the wind turbine tower 12 can be rotated may be determined by a bolt hole pattern at the foundation 16 and/or a bolt hole pattern between any two sections 12a, 12b, and 12c. While rotation angles at or around 90° are described, the advantages described herein may be at least partially realized with at angles less than 75°. Furthermore, embodiments of the invention are not limited to a single rotation to within the range described. It is noted that internal components to the wind turbine tower 12, such as ladders and cables, may rotate with the tower 12 or there may be enough slack so as not to impede tower rotation.

Figure 2B:
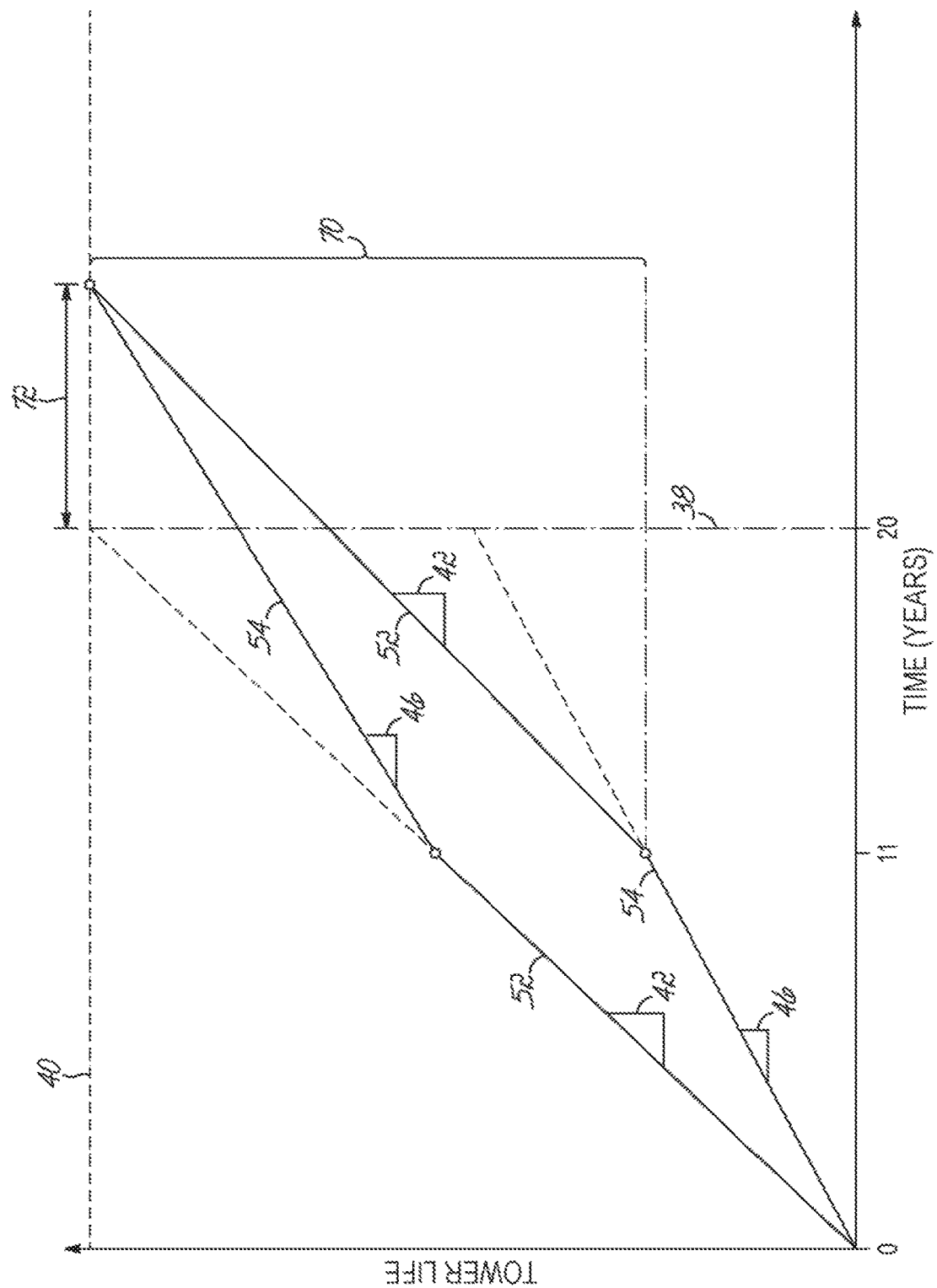

The effect of rotating the wind turbine tower 12 to reorient the wall portions 52 and 54 according to FIG. 4, for example, relative to the prevailing wind 30 is schematically illustrated in FIG. 2B. As an example, if the wind turbine tower 12 of FIG. 1 is operated for 11 years, the leading wall portion 52 experiences damage according to the first tower life rate 42 for 11 years. During that time, the sidewall portion 54 experiences damage at the second tower life rate 46 lower than the first tower life rate 42. After 11 years of operation, the relative portion of the total tower life 40 consumed by the wall portions 52 and 54 differ substantially, as is schematically shown in FIG. 2B. Quantitatively, for example, the leading wall portion 52 may be between about 40% and about 75% of the total tower life 40 while the sidewall portion 54 is substantially less at between about 10% and about 25% of the total tower life 40. The portion of total tower life 40 consumed depends on many factors, such as the operation of the wind turbine 10 among others.

At 11 years, during a retrofit of the energy generating unit, such as that shown in FIGS. 1, 3, and 5, the wind turbine tower 12 is rotated according to arrow 64 (FIG. 3). The arrow 64 depicting rotation of the wind turbine tower 12 is shown in FIG. 2B. At 11 years, the sidewall portion 54 has retained a significant portion of total tower life 40, as represented by a remaining service life 70. Rotation of the tower 12 according to arrow 64 repositions the sidewall portion 54 to face into the prevailing wind 30 (FIG. 5). The sidewall portion 54, because it is repositioned to experience a higher level of stress, now experiences the first tower life rate 42. And, the leading wall portion 52 experiences a lower level of stress according to the second tower life rate 46. As such, the useful life of the tower 12 may exceed the tower life design expectancy 38 by an amount 72, as shown. As another advantage, even if the tower 12 absorbs an unexpectedly large amount of damage so that it is not projected to reach the life expectancy design value 38, simply rotating the tower 12 relative to the prevailing wind 30 may permit the tower 12 to be utilized for a period of time sufficient to recoup associate capital cost of the wind turbine 10. Either way, rotating the tower 12 advantageously improves the service life of the new wind turbine 62.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A method of extending a life expectancy of a wind turbine tower secured to a foundation and a first energy generating unit on the wind turbine tower, the method comprising:
    detaching at least a portion of the wind turbine tower from the foundation, the at least a portion of the wind turbine tower having a first position relative to the foundation before detaching;
    rotating the detached at least a portion of the wind turbine tower relative to the first position, wherein rotating the at least a portion of the wind turbine tower relative to the first position includes rotating the at least a portion of the wind turbine tower by an angle from 75° to 115° relative to the first position, and
    securing the detached at least a portion of the wind turbine tower (i) to the foundation or (ii) to another portion of the wind turbine tower that is secured to the foundation at the angle.

2. The method according to claim 1, wherein the wind turbine tower has at least two sections and rotating the detached at least a portion of the wind turbine tower relative to the first position includes rotating a first section of the at least two sections relative to a second section of the at least two sections.

3. The method according to claim 2, wherein the second section is secured to the foundation and rotating the detached at least a portion of the wind turbine tower relative to the first position does not include rotating the second section secured to the foundation.

4. The method according to claim 1, wherein the wind turbine tower has at least two sections and rotating the detached at least a portion of the wind turbine tower relative to the first position includes rotating each section of the at least two sections relative to the first position.

5. The method according to claim 1, wherein prior to rotating the detached at least a portion of the wind turbine tower relative to the first position, the method includes removing the first energy generating unit from the wind turbine tower.

6. The method according to claim 5, further including placing a second energy generating unit on the wind turbine tower after rotating the detached at least a portion of the wind turbine tower relative to the first position.

7. The method according to claim 1, wherein prior to rotating the detached at least a portion of the wind turbine tower relative to the first position, the method includes determining a direction of a prevailing wind when the wind turbine tower is at the first position and wherein rotating the detached at least a portion of the wind turbine tower relative to the first position includes rotating the detached at least a portion of the wind turbine tower relative to the direction of the prevailing wind.

8. The method according to claim 1, wherein prior to rotating the detached at least a portion of the wind turbine tower relative to the first position, the method includes determining a portion of the wind turbine tower experiencing a relatively high stress at the first position and wherein rotating the detached at least a portion of the wind turbine tower relative to the first position includes rotating the detached portion of the wind turbine tower to a second position at which the portion that experienced the relatively high stress is subject to a lower stress.

9. The method according to claim 1, wherein prior to rotating the detached at least a portion of the wind turbine tower relative to the first position, the method includes measuring damage on the at least a portion of the wind turbine tower.

10. The method according to claim 9, wherein measuring damage on the at least a portion of the wind turbine tower includes measuring damage on a leading wall portion of the wind turbine tower.

11. The method according to claim 10, wherein measuring damage on the at least a portion of the wind turbine tower includes measuring damage on a sidewall portion that is orthogonally oriented relative to the leading wall portion of the wind turbine tower.

12. The method according to claim 1, wherein the wind turbine tower has a tower height, the first energy generating unit being on the wind turbine tower at the tower height, and wherein following securing the detached at least a portion of the wind turbine tower relative to the first position, the first energy generating unit remains at the tower height.

13. The method according to claim 1, wherein the wind turbine tower is secured to the foundation with grout and prior to detaching the at least a portion of the wind turbine tower, the method further comprises:
removing the grout.

14. The method according to claim 13, wherein securing the detached at least a portion of the wind turbine tower to the foundation at the angle includes grouting the at least a portion of the wind turbine tower to the foundation.

15. The method according to claim 1, wherein the wind turbine tower includes a door near the foundation at the first position and wherein rotating the detached at least a portion of the wind turbine tower relative to the first position repositions the door relative to the foundation.

16. A method of extending a life expectancy of a wind turbine tower secured to a foundation and a first energy generating unit on the wind turbine tower, the wind turbine tower having a first position on the foundation and defining a generally vertical tower axis, the method comprising:
rotating at least a portion of the wind turbine tower about the generally vertical tower axis relative to the first position, wherein rotating the at least a portion of the wind turbine tower relative to the first position includes rotating the at least a portion of the wind turbine tower by an angle from 75° to 115° relative to the first position, and
securing the detached at least a portion of the wind turbine tower (i) to the foundation or (ii) to another portion of the wind turbine tower that is secured to the foundation at the angle.

17. The method according to claim 16, wherein the wind turbine tower has at least two sections and rotating the at least a portion of the wind turbine tower relative to the first position includes rotating a first section of the at least two sections about the generally vertical tower axis relative to a second section of the at least two sections.

18. The method according to claim 17, wherein the second section is secured to the foundation and rotating the at least a portion of the wind turbine tower about the generally vertical tower axis relative to the first position does not include rotating the second section secured to the foundation.

19. The method according to claim 16, wherein the wind turbine tower has at least two sections and rotating the at least a portion of the wind turbine tower about the generally vertical tower axis relative to the first position includes rotating each section of the at least two sections relative to the first position.

* * * * *